(12) United States Patent
Aspinall et al.

(10) Patent No.: US 8,796,632 B2
(45) Date of Patent: Aug. 5, 2014

(54) APPARATUS AND METHOD FOR RADIATION ANALYSIS

(75) Inventors: Michael Aspinall, West Midlands (GB); Malcolm Joyce, Lancaster (GB)

(73) Assignee: Hybrid Instruments Limited, Lancaster (GB)

( * ) Notice: Subject to any disclaimer, the term of this patent is extended or adjusted under 35 U.S.C. 154(b) by 222 days.

(21) Appl. No.: 13/253,574

(22) Filed: Oct. 5, 2011

(65) Prior Publication Data

US 2012/0080598 A1 Apr. 5, 2012

(30) Foreign Application Priority Data

Oct. 5, 2010 (GB) .................................. 1016749.2

(51) Int. Cl.
*G01T 1/20* (2006.01)
(52) U.S. Cl.
USPC ...................................................... 250/369
(58) Field of Classification Search
USPC ...................................................... 250/369
See application file for complete search history.

(56) References Cited

U.S. PATENT DOCUMENTS

| 3,717,753 | A | * | 2/1973 | Thomas | 250/306 |
| 4,677,300 | A | * | 6/1987 | Tawil et al. | 250/366 |
| 4,914,300 | A | * | 4/1990 | Kalish | 250/369 |
| 7,683,334 | B2 | * | 3/2010 | Farsoni et al. | 250/367 |
| 2004/0262530 | A1 | | 12/2004 | Reber et al. | |
| 2007/0290136 | A1 | | 12/2007 | Ivan | |
| 2010/0176286 | A1 | * | 7/2010 | Duraj | 250/262 |

OTHER PUBLICATIONS

Peter Davies, Search Report, Application No. GB1117081.8, Feb. 6, 2012, 6 pages, UK Intellectual Property Office, South Wales, United Kingdom.
M.D. Aspinall et al, Verification of the digital discrimination of neutrons and gamma rays using pulse gradient analysis by digital measurement of time of flight, Sep. 13, 2007, 8 Pages, vol. 583 pp. 432-438, Nuclear Instruments and Methods in Physics Research, United Kingdom.
B. D'Mellow et al, Digital discrimination of neutrons and gamma-rays in liquid scintillators using pulse gradient analysis, Nov. 15, 2006, 8 pages, vol. 578 pp. 191-197, Nuclear Instruments and Methods in Physics Research, United Kingdom.
Y. Kaschuck and B. Esposito, Neutron / gamma-ray digital pulse shape discrimination with organic scintillators, Jan. 11, 2004, 10 pages, vol. 551 pp. 420-428, Nuclear Instruments and Methods in Physics Research, United Kingdom.
Andreas Enqvist et al,Initial evaluation for a combined neutron and gamma ray multiplicity counter, Feb. 8, 2010, 6 pages, vol. 621 pp. 493-497, Nuclear Instruments and Methods in Physics Research, United Kingdom.
Wikipedia, Neutron Detection, www.wikipedia.org, Nov. 14, 2011, 10 pages, Wikipedia the free encyclopedia.

* cited by examiner

*Primary Examiner* — David Porta
*Assistant Examiner* — Hugh H Maupin
(74) *Attorney, Agent, or Firm* — Crain, Caton & James

(57) ABSTRACT

Embodiments of the present invention provide an apparatus for radiation analysis, comprising a pulse discrimination module arranged to receive a signal corresponding to a pulse output by a scintillator and to determine a discrimination value indicative of one or more characteristics of the pulse, and a radiation type determination module for determining a type of radiation responsible for the pulse according to the discrimination value.

11 Claims, 4 Drawing Sheets

APPARATUS AND METHOD FOR RADIATION ANALYSIS

CROSS-REFERENCE TO RELATED APPLICATIONS

This application claims priority under 35 U.S.C. §119 to UK patent application GB 1016749.2, filed Oct. 5, 2010, the disclosure of which is incorporated herein by reference

STATEMENT REGARDING FEDERALLY SPONSORED RESEARCH

Not applicable.

FIELD OF THE INVENTION

The present invention relates to apparatus and method for radiation analysis. Embodiments of the invention relate to apparatus and methods for analysing radiation fields including at least first and second types of radiation. In particular, although not exclusively, embodiments of the invention relate to apparatus and methods for analysing radiation fields including neutron and γ-ray components.

BACKGROUND OF THE INVENTION

Many radiological environments include radiation components of a plurality of different types. Typically radiological environments include a neutron and a γ-ray component. Such environments include those associated with nuclear reactors, particle accelerators, neutron sources, neutron generators and radiation fields associated with security screening, amongst others.

Existing technologies for investigating such mixed radiation fields have numerous disadvantages. Particularly, although not exclusively, existing technologies are large and heavy. This is especially problematic for investigating radiation fields existing in difficult to access locations. Furthermore, a speed of response required of apparatus for use with certain types of detectors has necessitated use of bulky and inefficient analogue instrumentation.

It is an object of embodiments of the invention to at least mitigate one or more of the problems of the prior art.

SUMMARY OF THE INVENTION

The present invention therefore, overcomes one or more deficiencies in the prior art by providing apparatus and method for radiation analysis.

In one embodiment, the present invention includes an apparatus for radiation analysis, comprising: a) a pulse discrimination module arranged to receive a signal corresponding to a pulse output by a scintillator and to determine a discrimination value indicative of one or more characteristics of the pulse; and b) a radiation type determination module for determining a type of radiation responsible for the pulse according to the discrimination value.

In another embodiment, the present invention includes a radiation detection system comprising a) an apparatus comprising a pulse discrimination module arranged to receive a signal corresponding to a pulse output by a scintillator and to determine a discrimination value indicative of one or more characteristics of the pulse and a radiation type determination module for determining a type of radiation responsible for the pulse according to the discrimination value; and b) the scintillator-based radiation detector arranged to output a pulse corresponding to a radiation detection event.

In another embodiment, the present invention includes a method of radiation analysis, comprising a) determining a discrimination value indicative of one or more characteristics of a signal corresponding to a pulse received from a scintillator; and b) determining a radiation type responsible for the pulse according to the decay value.

Additional aspects, advantages and embodiments of the invention will become apparent to those skilled in the art from the following description of the various embodiments and related drawings.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Embodiments of the invention provide an apparatus for radiation analysis. The apparatus comprises a pulse discrimination module arranged to receive a signal corresponding to a pulse output by a scintillator and to determine a discrimination value indicative of one or more characteristics of the pulse; and a radiation type determination module for determining a type of radiation responsible for the pulse according to the discrimination value.

In some embodiments the discrimination value is indicative of a rate of decay of the pulse. The discrimination value may be determined by the pulse discrimination module to be indicative of a magnitude of the pulse at a predetermined decay time. The discrimination value may be indicative of the magnitude of the pulse subsequent to an initial magnitude of the pulse.

Figure 1:
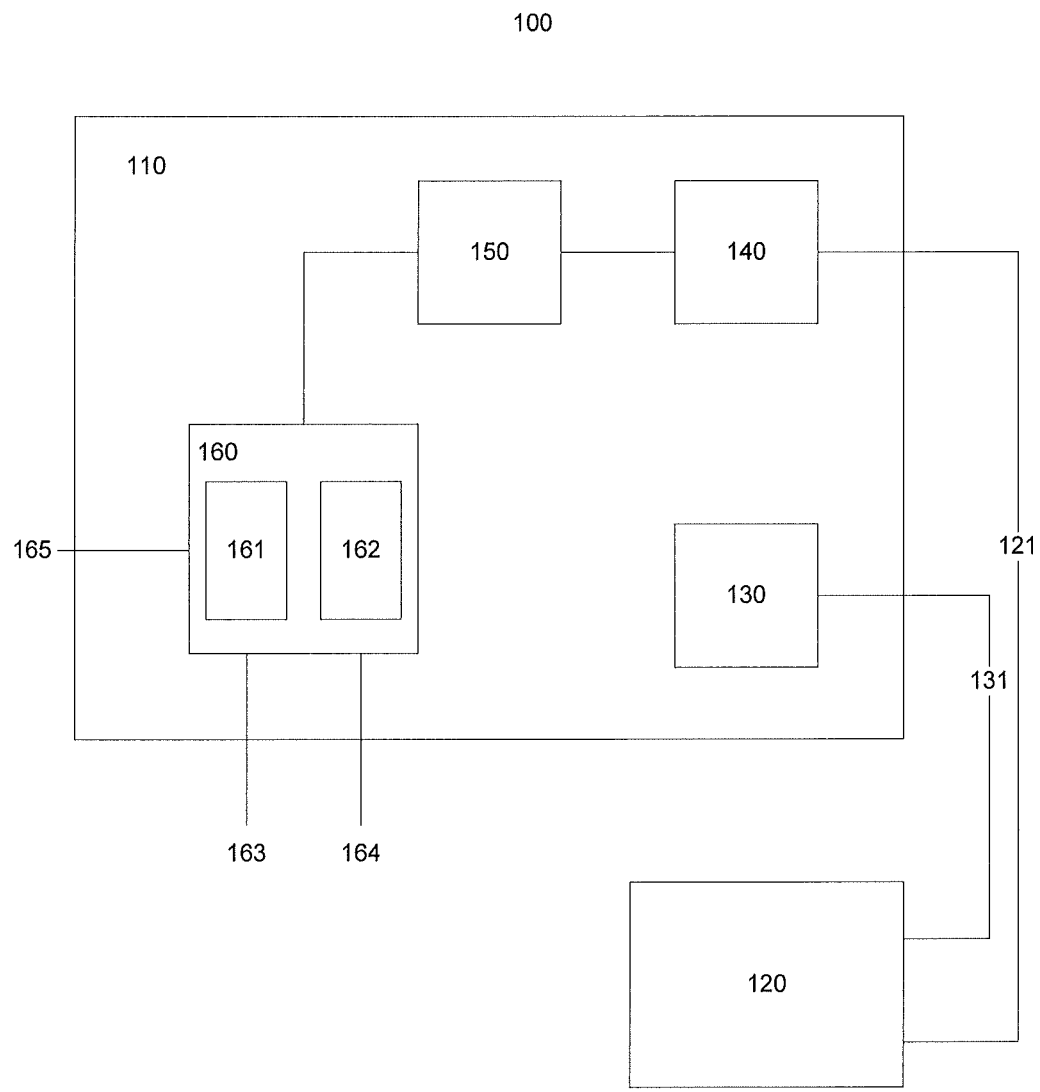
FIG. 1 is a schematic diagram of an apparatus according to an embodiment of the invention.

Referring to FIG. 1, a system 100 according to an embodiment of the invention is shown. The system 100 includes a radiation analyser 110, according to an embodiment of the invention, and a radiation detector 120.

The radiation detector 120 includes a scintillation detector in which ionisation is caused within a scintillator material by radiation impinging on the material, in a radiation detection event, such that a pulse of light is output from the material 120 in response thereto. One or more photodetectors, such as a photomultiplier tube or a photodiode, are arranged to receive the pulse of light output by the scintillator material and to output an electrical detector signal 121 in response thereto which comprises a pulse corresponding to each radiation detection event. The scintillator material may be a solid, such as plastic, or a liquid. The scintillator may be an organic scintillator.

The radiation analyser 110 comprises a high-voltage (HT) power supply unit 130 which is arranged to provide a high-voltage power supply 131 to the radiation detector 120. In some embodiments the power supply 131 has a selectable voltage in the range of 0 to −3000 Volts, although it will be realised that other output voltage ranges may be envisaged. The high-voltage power supply unit 130 generates the high-voltage supply 131 from an internal supply voltage of the analyser 110, which may be relatively low, such as 12 or 18 Volts, although other internal supply voltages may be envisaged. The internal supply voltage may be provided to the analyser 110 from an external power supply unit, or an internal battery, neither of which are shown for clarity.

The analyser 110 further comprises an amplifier 140 for amplifying the detector signal 121 received from the detector 120 in response to ionisation within the scintillator material of the detector 120. The amplifier 140 may have a variable gain which is controlled in response to a calibration process to correctly amplify the received detector signal 121. The gain of the amplifier may be controlled by a processing unit 160 of the analyser 110.

The amplified signal output from the amplifier 140 is received by an analogue-to-digital convertor (ADC) 150 which digitises the received analogue input signal. In some embodiments the ADC 150 is 12-bit, although other resolution ADCs may be used. The ADC 150 may operate at a predetermined sampling frequency, such as 500 MHz, although it will be realised that other sampling frequencies may be used. The ADC 150 outputs a digitised detector signal comprising a sequence of digital sample values corresponding to the analogue signal level of the amplified signal.

The digitised detector signal output from the ADC 150 is input to a processing unit 160 which is arranged to output a signal indicative of the type of radiation responsible for each radiation detection event.

As shown in FIG. 1, in some embodiments the processing unit 160 may provide an output via an interface comprising a plurality of dedicated output lines each corresponding to specific radiation type i.e. an output signal on one of a plurality of dedicated output lines 163, 164 each corresponding to a predetermined type of radiation. The provision of a signal corresponding to the type of radiation via a dedicated output line advantageously allows simultaneous indication of a plurality of types of radiation to be achieved. For example, in the case that the first output line 163 provides an output corresponding to neutron radiation whilst the second output line 164 carries an output corresponding to γ-ray radiation, output of signals on each of the output lines within a predetermined time period or overlapping each other may indicate simultaneous detection of both neutron and γ-ray radiation.

Each of the output lines may be arranged to output a generally square wave or pulse signal, such as a transistor-transistor logic (TTL) signal, although it will be realised that other voltage levels may be used. When idle, each output line 163, 164 may output a relatively high voltage, such as approximately 2.4 volts, although other high voltage levels may be used. When a radiation detection event occurs, the output voltage level may fall to a relatively low voltage level, such as substantially 0 volts. The output voltage level may have a predetermined rise time and a predetermined fall time. The fall time may be in the region of 40-50 ns and the rise time may be in the region of 10-20 ns, providing a total pulse duration of approximately 50-60 ns. However, in other embodiments, the output corresponding to each type of detected radiation or a digital representation of the pulse may be provided via the same interface. For example, the output corresponding to each type of radiation may be an encoded signal identifying the type of radiation. The output is provided substantially in real-time. In other words, the output is provided substantially instantaneously in response to receipt of the signal by the analyser. This differs from prior art analysis devices in which a period of analysis is required.

The processing unit 160 may be implemented by any type of digital processing device. In some embodiments of the invention, the processing device is a field-programmable-gate-array (FPGA) which implements the processing unit 160. The processing unit 160 comprises a pulse discrimination module 161 and a radiation type determination module 162.

The pulse discrimination module 161 is arranged to determine a discrimination value for each pulse. The discrimination value is determined according to one or more characteristics of the pulse. In some embodiments, the pulse discrimination module 161 is arranged to determine a shape of each pulse of the radiation detection signal and, in particular, a discrimination value for each pulse based on a decay rate of the pulse. The decay rate of each radiation detection event pulse varies according to the radiation type. The intensity I of fluorescence of an organic scintillator decays exponentially according to the equation:

$$I = I_0 \exp(-1/\tau)$$

where $I_0$ is the intensity at $\tau=0$, and $\tau$ is the fluorescence decay time and depends upon the type of radiation.

Figure 2:
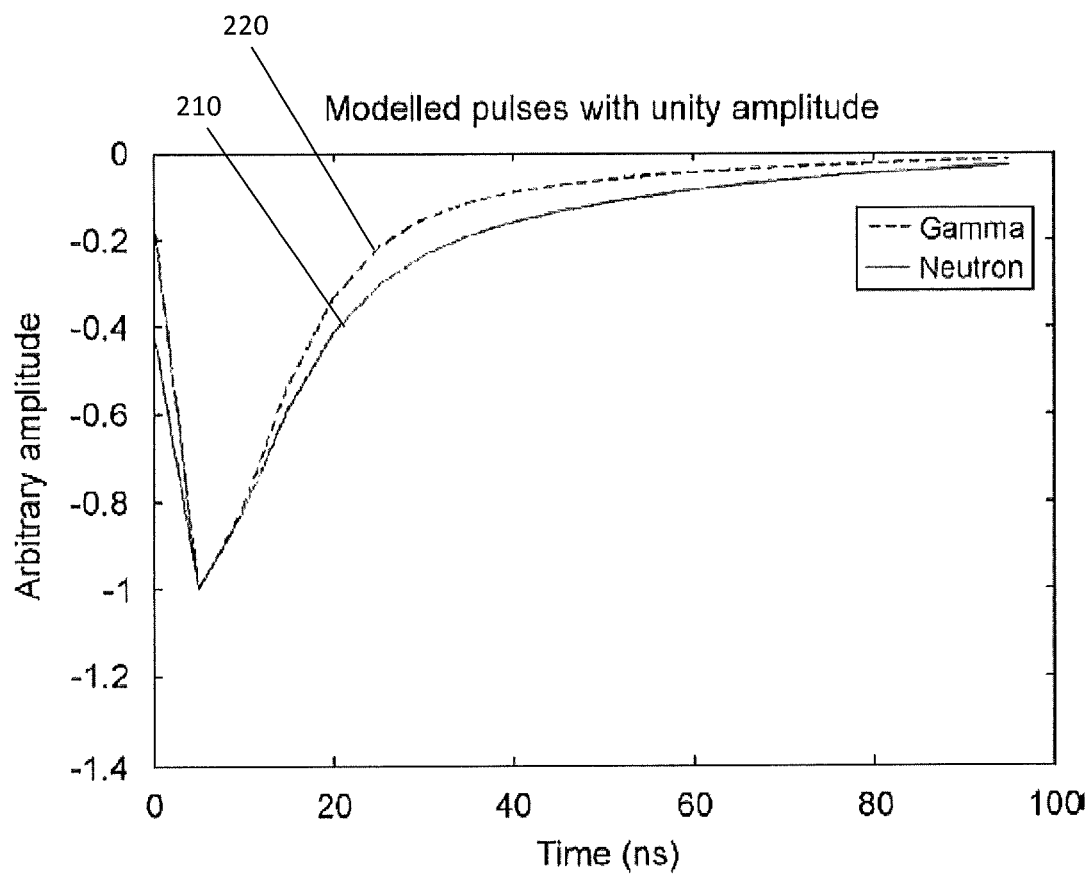
FIG. 2 shows a plot of amplitude versus time (ns) for a model of pulses of a neutron and γ-ray induced organic scintillator.

As can be appreciated from FIG. 2, which shows plot of amplitude versus time (ns) for a model of normalised intensity pulses corresponding to neutron 210 and γ-ray 220 induced organic scintillator output pulses, the pulse 210 resulting from neutron-induced ionisation decays more slowly than the γ-ray 220 pulse. Thus the pulse discrimination module 161 determines the discrimination value for each pulse corresponding to an estimate of the pulse decay gradient. Prior to determination of the discrimination value, in order to improve radiation analysis in the presence of noise, the pulse discrimination module 161 may remove pulses which have a peak amplitude less than a predetermined threshold. The remaining pulses may then be digitally filtered.

Figure 3:
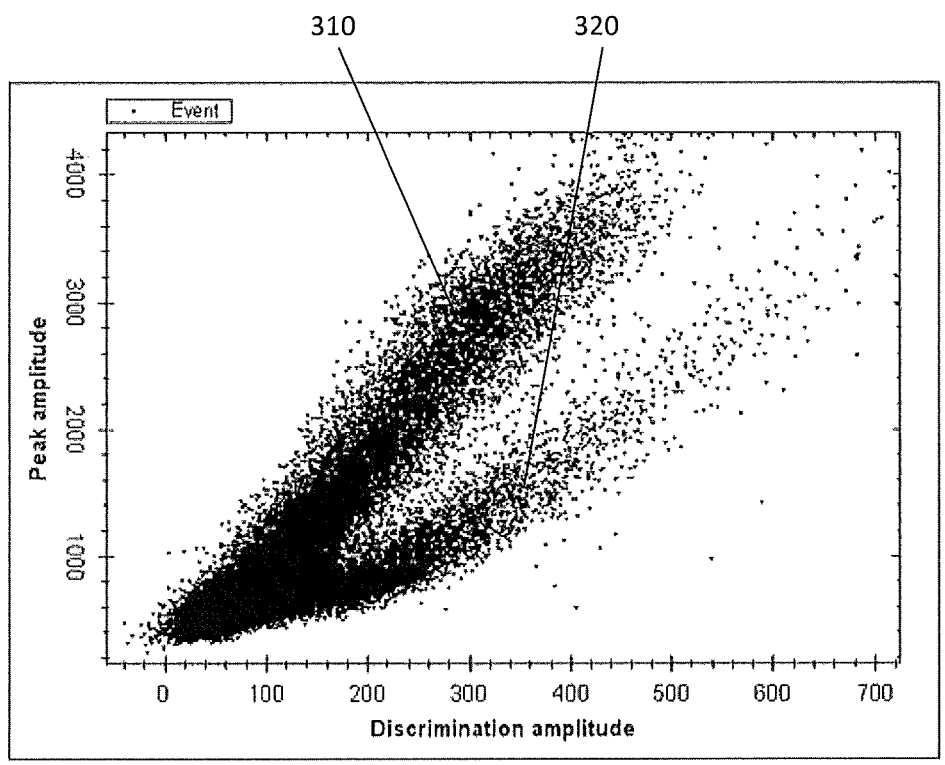
FIG. 3 shows a scatter plot of peak amplitude against an amplitude of a sample used for pulse gradient analysis.

FIG. 3 shows a plot of peak pulse amplitude (y-axis) against a value of a predetermined sample of the pulse (x-axis) for a plurality of pulses. The predetermined sample is the sample of the amplitude of the pulse at a time after $\tau=0$. In some embodiments, the predetermined sample is first sample of the decaying amplitude of the pulse i.e. the first sample after $I_0$, which may also be considered to be a second sample if the first sample of the pulse corresponds to the value of $I_0$. As can be seen, two distinct groups or "plumes" of events exist, each of which corresponds to a different type of radiation. An upper plume 310 formed by pulses having a greater peak to predetermined sample value ratio corresponds to γ-ray-induced pulses, whereas a lower plume 320 formed by pulses having lower ratio corresponds to neutron-induced pulses.

The radiation type determination module 162 determines a type of radiation corresponding to each event based on the respective amplitudes of the peak and predetermined samples of each detection event. In some embodiments, a threshold is determined during the calibration process by which the events corresponding to each radiation type may be distinguished.

In some embodiments, an event may be determined to result from γ-rays if a ratio of peak amplitude to the predetermined sample amplitude is greater than a predetermined value, and to result from neutrons if the ratio is less than the predetermined value. When the predetermined sample is the second sample, the predetermined value may, for example, be 11.4, although other values may be utilised. In other embodiments, the threshold may comprise two or more linear portions arranged to intersect at one or more angles, or the threshold may correspond to a non-linear function, such as a polynomial function e.g. a quadratic function.

The pulse discrimination module 161 and the radiation type determination module 162 may both be implemented on the same or separate processing devices, such as FPGAs. In alternate embodiments, the pulse discrimination module 161 may be implemented on an FPGA and the radiation type determination module 162 may be implemented on a separate type of processing unit, such as a digital signal processor (DSP).

The analyser comprises a data interface 165 for outputting data corresponding to a plurality of detection events. The processing unit 160 may be arranged to store in a memory (not shown) data corresponding to each detection event. The data may comprise an indication of the peak and predetermined amplitudes for each event. In response to a predetermined stimulus, such as a key press on an interface (not shown) of the analyser or an instruction received by the data interface 165, the processing unit 160 may output the stored data via the interface as a sequence of data value pairs e.g. <peak_amplitude; predetermined sample amplitude>. Alternatively, the processing unit 160 may output the sequence of data values as they are determined i.e. operate in an "on-line" mode. The data interface may be a network interface according to a predetermined standard, such as Ethernet.

Embodiments of the invention provide a method of radiation analysis, comprising determining a discrimination value indicative of one or more characteristics of a signal corresponding to a pulse received from an organic scintillator; and determining a radiation type responsible for the pulse according to the decay value.

Figure 4:
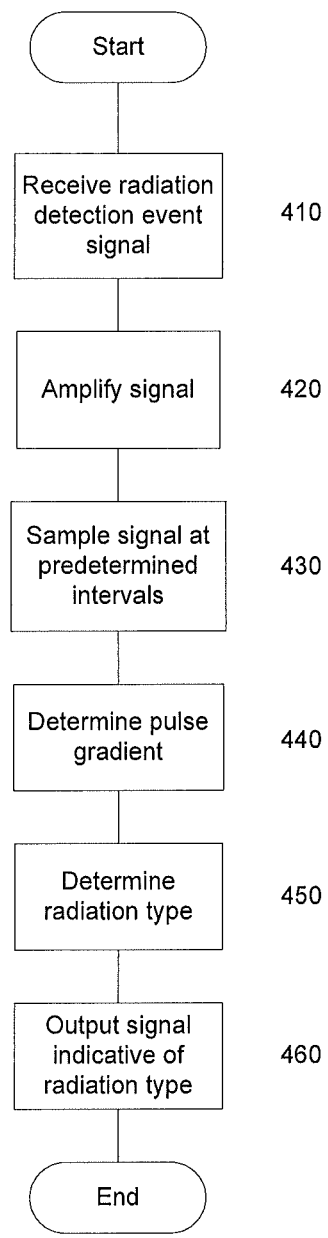
FIG. 4 shows a method of radiation analysis according to an embodiment of the invention.

A method according to an embodiment of the invention will now be described with reference to FIG. 4.

In step 410 a pulse corresponding to a radiation detection event is received. The pulse may be received from a scintillator-based radiation detector, such as that shown in FIG. 1. In step 420 the pulse is amplified. The pulse may be amplified by an amplification level determined in a calibration process. As part of step 420, the signal may be filtered. The filtering may be a finite impulse response (FIR) filter. In step 430 the pulse is sampled at a sampling rate, such as 500 MHz to produce a digital value at each sampling time. In step 440 a discrimination value indicative of one or more characteristics of the pulse shape is determined. In some embodiments the discrimination value is determined indicative of the pulse decay gradient. In step 450 the radiation type is determined according to the discrimination value. Finally, in step 460, a signal is output indicative of the determined radiation type. The signal may be a signal on one of a plurality of dedicated signal output lines, or may be indicative of the radiation type and output via an interface used for all radiation types.

Embodiments of the invention may also include a computer program which, when executed by a computer, cause the computer to determine a discrimination value indicative of one or more characteristics of a signal corresponding to a pulse received from a scintillator; and determine a radiation type responsible for the pulse according to the decay value. The computer program may be stored on a computer-readable storage medium.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An apparatus for radiation analysis, comprising:
a pulse discrimination module arranged to receive a signal corresponding to a pulse output by a scintillator and to determine a discrimination value indicative of one or more characteristics of the pulse; and
a radiation type determination module for determining a type of radiation responsible for the pulse according to the discrimination value, wherein the radiation type determination module is arranged to determine whether the type of radiation responsible for the pulse is —neutron or gamma ($\gamma$) radiation and to output a signal indicative of the radiation type in real time in response to the signal.

2. The apparatus of claim 1, wherein the radiation type determination module determines the type of radiation responsible for the pulse according to the discrimination value and a predetermined threshold.

3. The apparatus of claim 2, wherein the predetermined threshold is one of linear, comprising a plurality of angularly intersecting linear portions or a polynomial function.

4. The apparatus of claim 1, wherein the radiation type determination module determines the type of radiation responsible for the pulse according to the discrimination value and an initial magnitude of the signal.

5. The apparatus according to claim 1, wherein the pulse discrimination module and radiation type determination module are digitally implemented.

6. The apparatus of claim 1, wherein the signal is an output on a dedicated output indicative of the radiation type.

7. The apparatus of claim 6, wherein the output is a square wave signal.

8. The apparatus of claim 1, comprising a high-voltage power supply for providing a power supply for a scintillator detector.

9. A radiation detection system comprising:
- an apparatus comprising a pulse discrimination module arranged to receive a signal corresponding to a pulse output by a scintillator and to determine a discrimination value indicative of one or more characteristics of the pulse and a radiation type determination module for determining a type of radiation responsible for the pulse according to the discrimination value, determine whether the type of radiation responsible for the pulse is neutron or gamma (γ) radiation and to output a signal indicative of the radiation type in real time in response to the signal; and
- the scintillator-based radiation detector is arranged to output a pulse corresponding to a radiation detection event.

10. A method of radiation analysis, comprising:
- determining a discrimination value indicative of one or more characteristics of a signal corresponding to a pulse received from a scintillator;
- determining a radiation type responsible for the pulse according to the decay value wherein the radiation type determination module is arranged to determine whether the type of radiation responsible for the pulse is neutron or gamma (γ) radiation; and
- outputting a signal indicative of the radiation type in real time in response to receiving the pulse.

11. The method of claim 10, wherein the discrimination value is indicative of one or more characteristics of the pulse shape.

* * * * *